(12) United States Patent
Robinson et al.

(10) Patent No.: US 9,498,830 B1
(45) Date of Patent: Nov. 22, 2016

(54) AUTOMATED BONING MACHINE FOR WOODEN BATS

(75) Inventors: Mark Robinson, St. Louis, MO (US);
Kyle Murphy, St. Louis, MO (US);
Dale Blust, O'Fallon, MO (US)

(73) Assignee: RAWLINGS SPORTING GOODS COMPANY, INC., St. Louis, MO (US)

( * ) Notice: Subject to any disclaimer, the term of this patent is extended or adjusted under 35 U.S.C. 154(b) by 1094 days.

(21) Appl. No.: 13/568,864

(22) Filed: Aug. 7, 2012

(51) Int. Cl.
*B23C 7/00* (2006.01)
*B21D 22/00* (2006.01)

(52) U.S. Cl.
CPC ..................... *B23C 7/00* (2013.01)

(58) Field of Classification Search
CPC ...... A63B 59/50; A63B 59/51; A63B 59/52;
A63B 59/54; A63B 59/58; B23B 7/00;
B23B 7/06; B21D 22/16
See application file for complete search history.

(56) References Cited

U.S. PATENT DOCUMENTS

| | | | | |
|---|---|---|---|---|
| 4,038,850 A | * | 8/1977 | Sakagami | B21D 22/16 72/370.1 |
| 5,626,050 A | * | 5/1997 | Ploughe | B21B 21/005 72/208 |
| 6,139,451 A | * | 10/2000 | Hillerich, III | B29C 61/006 473/564 |
| 6,352,485 B1 | * | 3/2002 | Philpot | B29C 70/32 473/564 |
| 7,229,370 B1 | * | 6/2007 | Vacek | A63B 59/50 473/567 |
| 7,328,599 B2 | * | 2/2008 | Van Nguyen | A63B 59/00 72/206 |
| 2003/0186035 A1 | * | 10/2003 | Cruce | C04B 41/009 428/292.4 |
| 2004/0198539 A1 | * | 10/2004 | Sutherland | A63B 59/50 473/567 |
| 2009/0163307 A1 | * | 6/2009 | Fujii | A63B 59/50 473/564 |
| 2011/0015008 A1 | * | 1/2011 | MacDougall | B27M 3/22 473/564 |

* cited by examiner

*Primary Examiner* — Will Fridie, Jr.
(74) *Attorney, Agent, or Firm* — Husch Blackwell LLP (57) ABSTRACT

An apparatus for bone rubbing a wooden bat. The wooden bat generally has a length, a knob, a barrel, and a barrel end. The apparatus comprises a base, a knob securing section, a barrel and securing section, a translating pressure tool, and a controller.

19 Claims, 8 Drawing Sheets

AUTOMATED BONING MACHINE FOR WOODEN BATS

This is a Non-Provisional Patent Application by Mark Robinson, a citizen of the United States, with a mailing address of 510 Maryville University Dr., Suite 110, St. Louis, Mo. 63141; and Kyle Murphy, a citizen of the United States, with a mailing address of 510 Maryville University Dr., Suite 110, St. Louis, Mo. 63141; and Dale Blust, a citizen of the United States, residing at 6707 Keaton Corporate Parkway, O'Fallon, Mo. 63368, for an "Automated Boning Machine for Wooden Bats."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present disclosure relates generally to an apparatus and process for improving the quality of a wooden bat. More particularly, the present disclosure relates to the "boning" of a wooden bat to increase its quality and performance.

The actual art of "boning" a bat is an old tradition that extends back decades in baseball. This process is typically where a person would take an animal bone, such as a cow bone or pig bone, and rub the bat with the bone while applying pressure. Typically, the area of the bat that was rubbed is the barrel portion, or hitting portion, of the bat. The concept is to smooth down the grain of the bat with the purpose of potentially making the barrel portion of the bat flatter, harder, and sealing pores within the wood.

The general concept for the need to "bone" a bat arises from the manufacturing process of a wooden bat itself. Typically, a wooden bat is turned on a lathe while the wood is cut, or sheared, down to the specifications of the bat desired. This cut is typically against the grain of the wood itself and leaves microscopic tears in the grain of the wood. Boning will typically compress the cells of the wood, lay down the rough edges caused by the tears, and smooth the exterior surface of the bat. If done correctly, the process can prolong the life of the bat by eliminating or reducing minute scratches and tears in the bat surface. These scratches and tears can allow moisture to infiltrate the bat, develop into cracks, and cause the demise or break of the bat. A properly "boned" unfinished bat will look as if it has been finished with a semi-gloss sealer.

Up until now, the conventional ways to bone a bat were to place a bone-type-object in a clamp or vise and rub the barrel length of the bat along the bone. Alternately, the player would hold the bat in his or her lap or hand and rub the bone across the bat accordingly. Even production facilities typically place a bat in a lathe or holding device and still manually rub the bone-type-structure across the barrel length to bone the bat. These activities result in uneven pressure and uneven coverage of the barrel section of the bat. This can defeat the very purpose of boning the bat to begin with by allowing a non-uniform application of the boning process. This kind of non-uniform application typically does not properly seal the bat and results in the micro tears and fractures that allow moisture within the bat and lead to an early failure of the bat due to the infiltration of that moisture. Additionally, this moisture can also increase the weight of the bat thereby reducing performance of the bat when swung due to a lack of bat speed by the player.

What is needed then is an automated boning process for wooden bats. Preferably this process provides a uniform application of the boning technique to properly process the bat for use. This apparatus and method is lacking in the art.

BRIEF DESCRIPTION OF THE EMBODIMENTS

Disclosed herein is an apparatus for bone rubbing a wooden bat. The wooden bat generally has a length, a knob, a barrel, and a barrel end. The apparatus comprises a base, a knob securing section, a barrel and securing section, a translating pressure tool, and a controller.

The knob securing section is attached to the base and shaped to accept the knob of the wooden bat. The barrel end securing section can be rotatable and is attached to the base opposite the knob securing section. The barrel end securing section is shaped to accept the barrel end of the wooden bat and can include an axis extending towards the knob securing section. The translating pressure tool can be attached to the base proximate to the barrel end securing section and can include a bone attachment location positioned proximate the axis and opposite the base. This bone attachment location can be shaped to accept bone. The controller is operably attach to the barrel end securing section and to the translating pressure tool. The controller has program instructions to rotate the rotatable barrel end securing section, move the translating pressure tool approximately parallel to at least a portion of the length of the wooden bat, and engage the wooden bat with the bone when the wooden bat and the bone are positioned in the apparatus.

The knob securing section can further include a rail attached to the base and a clamp slideably positioned along the rail. The clamp can secure a wooden bat between the knob securing section and the barrel end securing section. More specifically, the knob securing section can further include a knob holder extended from the clamp and shaped to accept the knob of the wooden bat. In this embodiment, the controller can be operably attached to the knob securing section and include programming instructions to secure the wooden bat between the knob securing section and the barrel end securing section when the wooden bat is positioned in the apparatus.

The barrel end securing section can further include a shaft operably attached to the base, a barrel end holder extending from the shaft and shaped to accept the barrel end of a wooden bat, and a drive mechanism attached to the base and the shaft. The drive mechanism can be positioned to rotate the shaft and the barrel end holder along the axis. Additionally, the barrel end securing section can include at least one bearing attached to the base and supporting the shaft for rotation. The controller can include program instructions to operate the drive mechanism to rotate the shaft, barrel end holder, and the wooden bat along the axis when the wooden bat is positioned in the apparatus.

The translating pressure tool can further include a track, a carrier, a translating device, an armature, and a pressure device. The track can be positioned approximately parallel with the axis and the carrier can be operably attached to the track. The translating device can be operably attached to the base and the carrier while the armature can be pivotally attached to the carrier and have the bone attachment location. The pressure device can be attached to the carrier and to the armature and be positioned to move the armature and the bone attachment location to engage the bone to the wooden bat when the wooden bat and the bone are positioned in the apparatus. The controller can include programming instructions to activate the translating device to move the carrier along the track. These programming instructions can also have the controller activate the pressure device mechanism to move the armature and a bone attachment location to engage the bone along the barrel of the wooden bat when the wooden bat and the bone are positioned in the apparatus.

It is therefore a general object of the current disclosure to provide an automated apparatus and method for "boning" a wooden bat.

Another object of the present disclosure is to provide an apparatus and method to process a post-production wooden bat to enhance its characteristics.

Still another object of the current disclosure is to provide an apparatus and method to increase the longevity of a bat.

Other and further objects, features and advantages of the present disclosure will be readily apparent to those skilled in the art upon reading of the following disclosure when taken in conjunction with the accompanying drawings.

DETAILED DESCRIPTION OF THE INVENTION

Referring generally now to FIGS. 1-8, an apparatus for bone rubbing a wooden bat is shown and generally designated by the numeral 10. The wooden bat 12 has a length 11, a knob 13, a barrel 14, and a barrel end 15. The apparatus 12 includes a base 16, a knob securing section 18, a barrel end securing section 20, a pressure tool 22, and a controller 24.

The terms "controller," "control circuit" and "control circuitry" as used herein may refer to a processor-readable and non-transitory memory medium such as a general microprocessor, application specific integrated circuit (ASIC), microcontroller, or the like as may be designed and programmed to cause specific functions as further defined herein to be performed upon execution by a processing unit, either alone or in combination with a field programmable gate array or various alternative blocks of discrete circuitry as known in the art.

The term "bone" individually and as used in "bone attachment location" and "boning" may refer to the use of any object that is more dense than the wood of the wooden bat 12 being processed. For example, "bone" can be true bone, such as that from an animal, e.g. a cow or pig, a more dense wood, metal, heavy glass, and the like. A detailed view of the bone attachment location 28 and an example of bone 30 can be seen in FIG. 8.

The base 16 can be a structure sized enough to support and stabilize the other aspects of the apparatus 10. Preferably this base 16 can be in a general table shape and can include stanchions, such as support legs, to suspend the other aspects of the apparatus 10 above a surface, such as a floor or the ground. Alternately, the base 16 can be generally flat and rest upon another supporting structure. The base 16 should have sufficient length to properly house the other components and stretch approximately the length if not longer than the wooden bat 12 that is to be processed.

The knob securing section 18 is attached to the base 16 and is shaped to accept the knob 13 of the wooden bat 12. The barrel end securing section 20 is attached to the base 16 opposite the knob securing section 18. The barrel end securing section is preferably rotatable, or at least a portion thereof is rotatable, and is shaped to accept the barrel end 15 of the wooden bat 12. The barrel end securing section also includes an axis 26 that extends in a direction towards the knob securing section 18. The pressure tool 22 is preferably a translating pressure tool that is attached to the base 16 proximate the barrel end securing section 20. The pressure tool 22 can include a bone attachment location 28 positioned proximate the axis 26 and opposite the base 16. This bone attachment location 28 is shaped to accept a bone 30.

The controller 24 is operably attached to the barrel end securing section 20 and to the pressure tool 22. The controller 24 includes programming instructions to rotate the barrel end securing section 20 and translate the pressure tool 22 in a direction approximately parallel to at least a portion of the length 11 of the wooden bat 12. The controller 24 also includes programming instructions to engage the wooden bat 12 with the bone 30 when the wooden bat 12 and the bone 30 are positioned in the apparatus 10.

Figure 7:
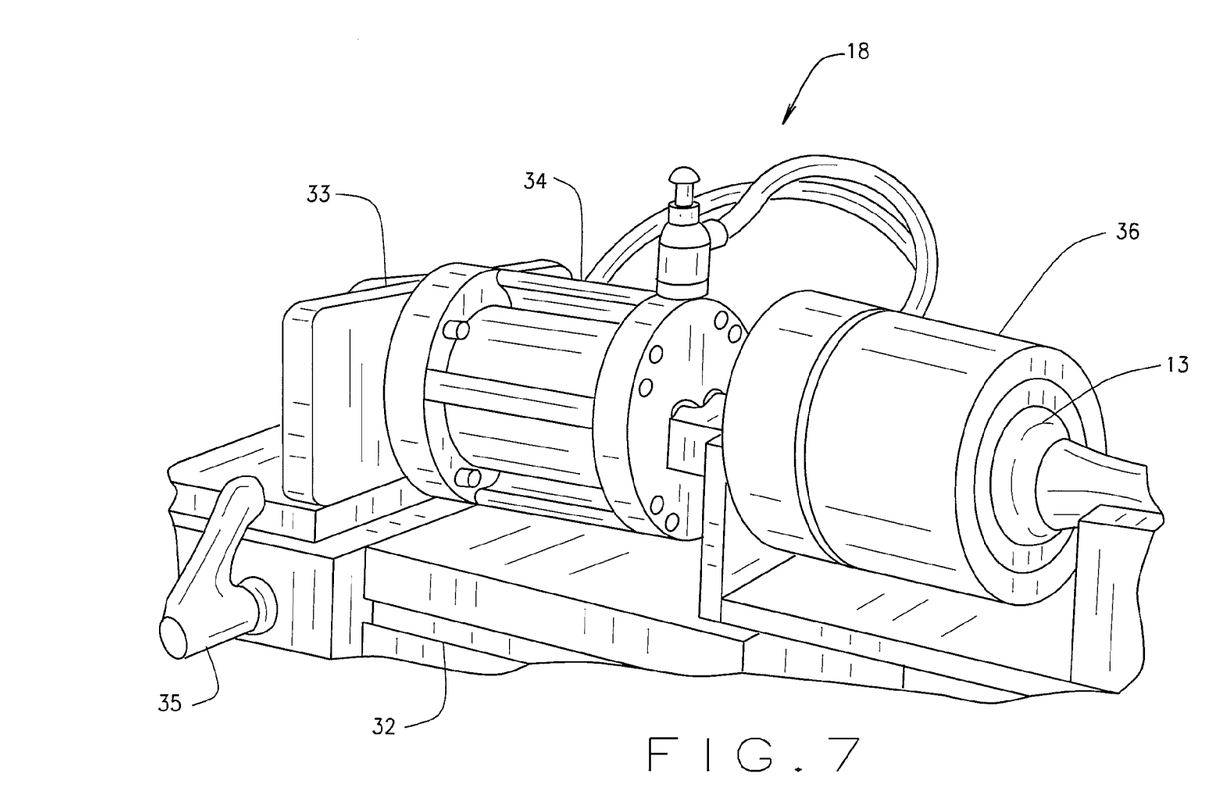
FIG. 7 is a partial detail view of the knob securing section of an apparatus made in accordance with the current disclosure.

The knob securing section 18 can further include a rail 32 attached to the base 16 and a clamp 34 slideably positioned along the rail 32. The clamp 34 is shaped and positioned to secure the wooden bat 12 between the knob securing section 18 and the barrel end securing section 20. The knob securing section 18 can further include a knob holder 36 extended from the clamp 34 wherein the knob holder is shaped to accept the knob 13 of the wooden bat 12. The knob holder 36 preferably has a concave shape as best seen in FIG. 7. The knob holder 36 can be comprised of many materials but preferably is made of a nylon material and can be described as being in a generally cup shape. The clamp 34 is preferably a mechanism that can extend the knob holder 36 towards the knob 13 of the wooden bat 12. This mechanism can be various devices known in the art and is preferably a pneumatic cylinder as generally shown in FIG. 7.

The clamp 34 and knob holder 36 can slide along rail 32 on a holder 33. This allows for the processing of various lengths of wooden bats 12 in the apparatus 10. The holder 33 can be move through a handle 35 that can release the holder 33 from the rail 32 and allow the holder 33 to slide along the rail 32 to the desired position. The handle 35 can be locked back in place and the clamp 34 actuated to engage the knob holder 36 to the knob 13 of the wooden bat 12. The controller 34 can be operably attached to the knob securing section 18 and can include program instructions to secure the wooden bat 12 through the operation of the clamp 34. This operation can have a predetermined stroke length for the clamp 34 or include pressure sensors to stop the movement of the clamp 34 once the resistance from the wooden bat 12 reaches a certain level, thereby ensuring the wooden bat 12 is secured between the knob securing section 18 and the barrel end securing section 20.

Figure 8:
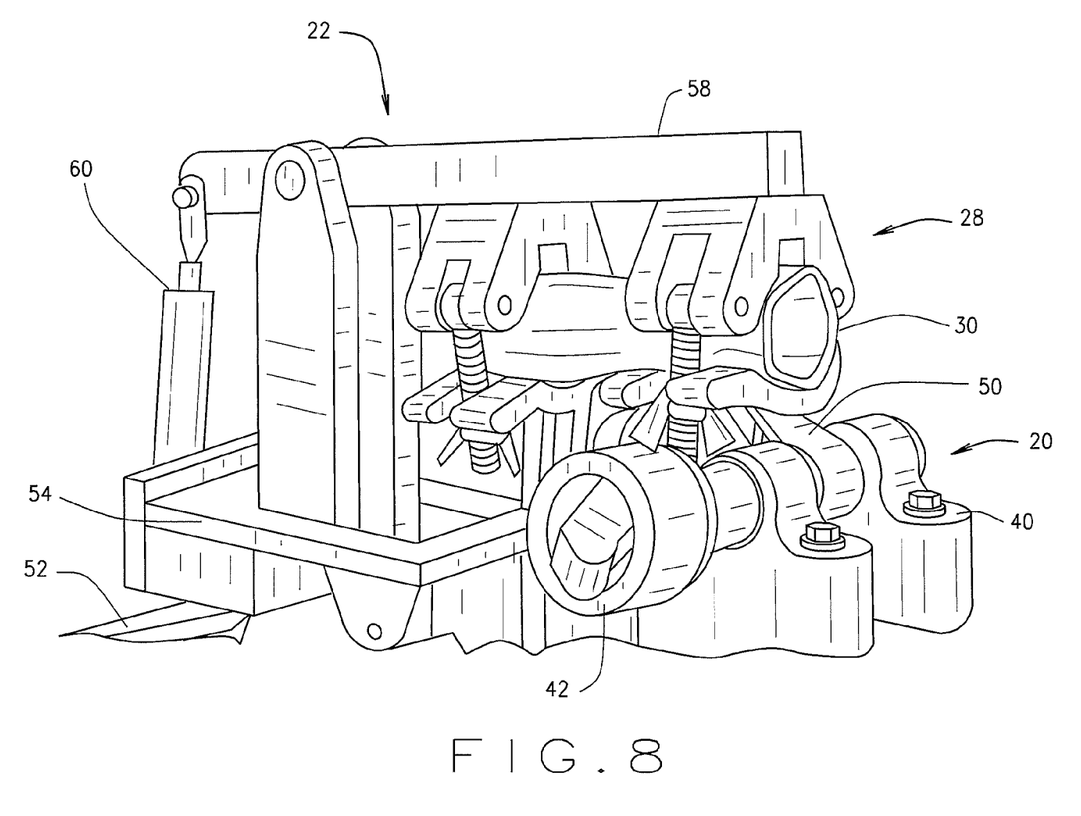
FIG. 8 is a partial detail view of the barrel end securing section of an apparatus made in accordance with the current disclosure.

The barrel end securing section 20 can include a shaft 38 operatively attached to the base 16. This attachment can be facilitated by at least one bearing 40 that can attach to the shaft 38 and the base 16 to support and suspend the shaft 38 from the base 16. A barrel end holder 42 can extend from the shaft 38 and is preferably shaped to accept the barrel end 15 of the wooden bat 12. The barrel end holder 42 is preferably concave in shape to match the general outside shape of the barrel end 15 of the wooden bat 12. The barrel end holder 42 can be made of several materials known in the art but can be preferably made of nylon and is generally cupped in shape, as best seen in FIG. 8.

A drive mechanism 44 can be attached to the base 16 and the shaft 38. The drive mechanism 44 is positioned to rotate the shaft 38 and the barrel end holder 42 along the axis 26. There can be multiple bearings 40 that support the shaft 38 and the drive mechanism 44 can connected to the shaft 38 between the bearings 40 as shown. This drive mechanism 44 can be one of several drive mechanisms known in the art but in a preferred embodiment is a pneumatic cylinder.

This drive mechanism 44 can be attached to a lever arm 46 and can include a slot 48 that allows adjustment of the interaction between the drive mechanism 44 and a lever arm 46 to control the amount of rotation of the shaft 38 and ultimately the wooden bat 12. The lever arm 48 can be attached to a clutch 50 mounted on a shaft that controls the movement of the shaft 38 in a singular rotation direction. This allows the retraction of the drive mechanism 44 without the corresponding backwards rotation of the shaft 38 and the wooden bat 12. This clutch 50 can be gear systems and clutches known in the art, such as a one-way clutch. The controller can include programming instructions to operate the drive mechanism 44 to rotate the shaft 38, barrel end holder 42 and the wooden bat 12 along the axis 26 when the wooden bat 12 is positioned in the apparatus 10.

The pressure tool 22, which can be described as a translating pressure tool 22, can include a track 52, a carrier 54, a translating device 56, an armature 58, and a pressure device 60. The track 52 can be attached to the base 16 and is positioned approximately parallel with the axis 26, while the carrier 54 is operably attached to the track 52. The translating device 56 can translate the carrier 54 along the track 52. The translating device 56 is operably attached to the base 16 and a carrier 54. The armature 58 can be pivotally attached to the carrier 54 and have the bone attachment location 28. The pressure device 60 can be attached to the carrier 54 and to the armature 58. The pressure device 60 can move the armature 58 and thus the bone attachment location 28. This movement can engage the bone 30 in the bone attachment location 28 to the wooden bat 12 when the wooden bat 12 and the bone 30 are positioned in the apparatus 10. The translating device 56 and a pressure device 60 can be various movement devices known in the art, but preferably they can be pneumatic cylinders as shown generally in the figures. These pneumatic cylinders can actuate to obtain the resulting movement in the carrier 54 and armature 58.

The controller 24 can include programming instructions to operate the translating device 56 to translate the carrier 54 along the track 52. Additionally the programming instructions can activate the pressure device 60 to move the armature 58 and, correspondingly, the bone attachment location 28 to engage the bone 30 along the barrel 14 of a wooden bat 12 when the carrier device 54 moves along the track 52. This occurs when a wooden bat 12 and bone 30 are positioned within the apparatus 10.

Figure 5:
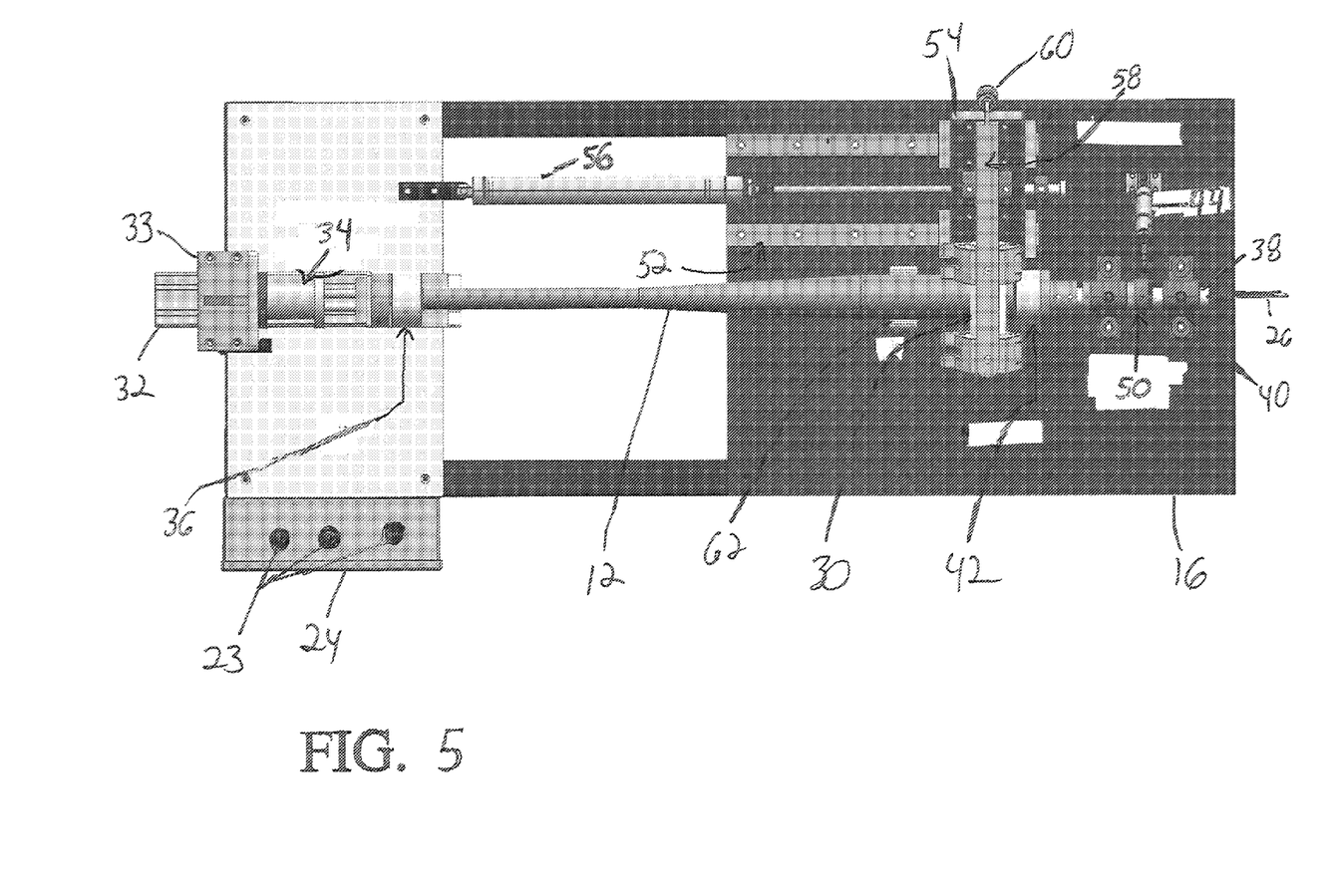
FIG. 5 is a top view of an apparatus made in accordance with the current disclosure.
Figure 6:
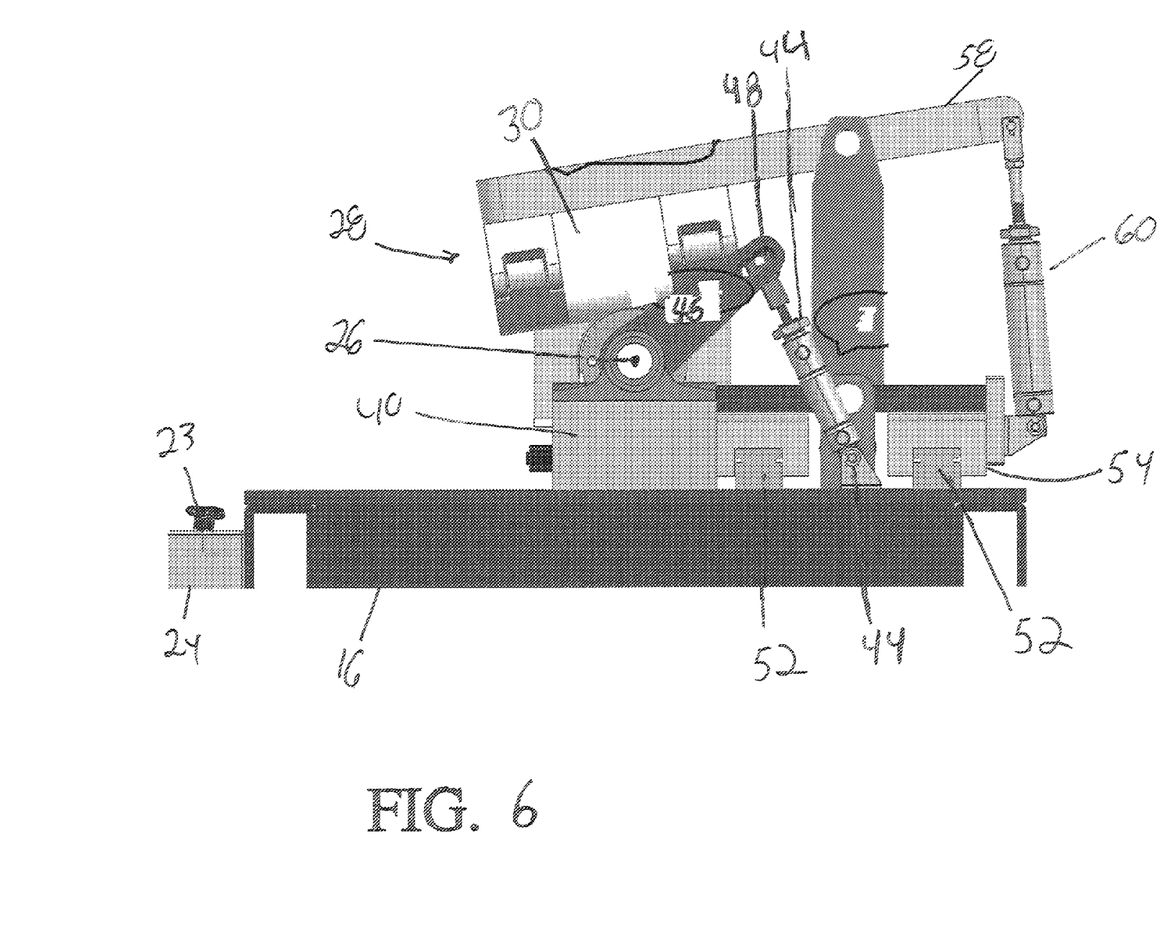
FIG. 6 is an end view of an apparatus made in accordance with the current disclosure.

In operation, the apparatus 10 can perform as follows. An operator can insert a wooden bat 12 into the apparatus 10. The operator can adjust the location of the holder 33 on the rail 32 such that the clamp 34 and knob holder 36 are proximate to the knob 13 as generally shown in FIG. 7. Alternately, as shown in FIG. 5, a bat support 62 can be positioned to facilitate in placement of the wooden bat 12 in the apparatus 10. Once in operation, however, the wooden bat 12 is preferably lifted from the bat support 62 such that it does not affect rotation of the wooden bat 12 during operation of the apparatus 10. Again, the knob holder 36 and barrel end holder 42 are preferably concave and/or tapered in nature to facilitate the engagement of the knob 13 and barrel end 15 within the knob holder 36 and barrel end holder 42 respectively. This facilitates the secured holding of the wooden bat 12 within the apparatus 10 during operation of the apparatus 10.

Figure 1:
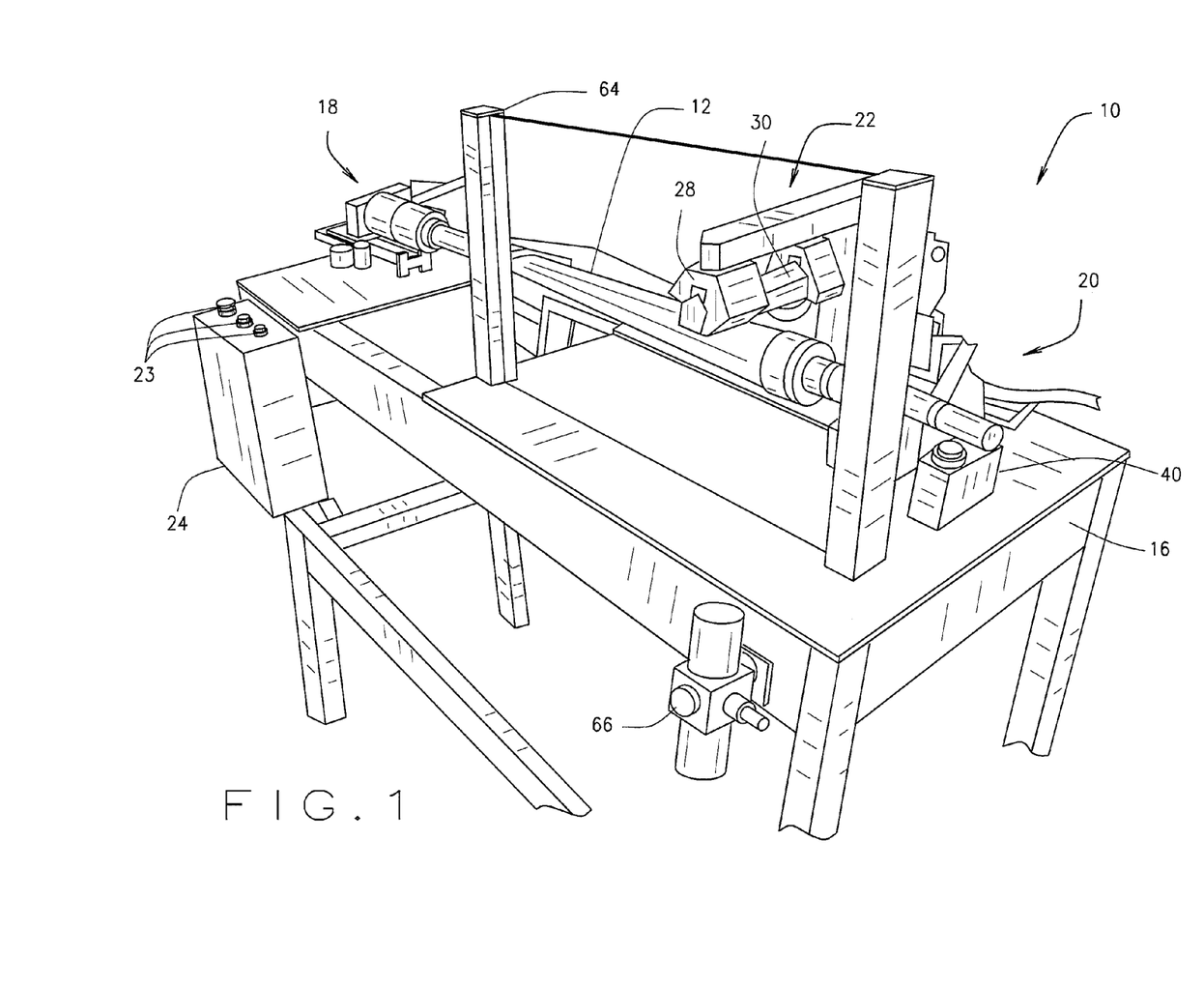
FIG. 1 is a perspective view of an apparatus made in accordance with the current disclosure.
Figure 2:
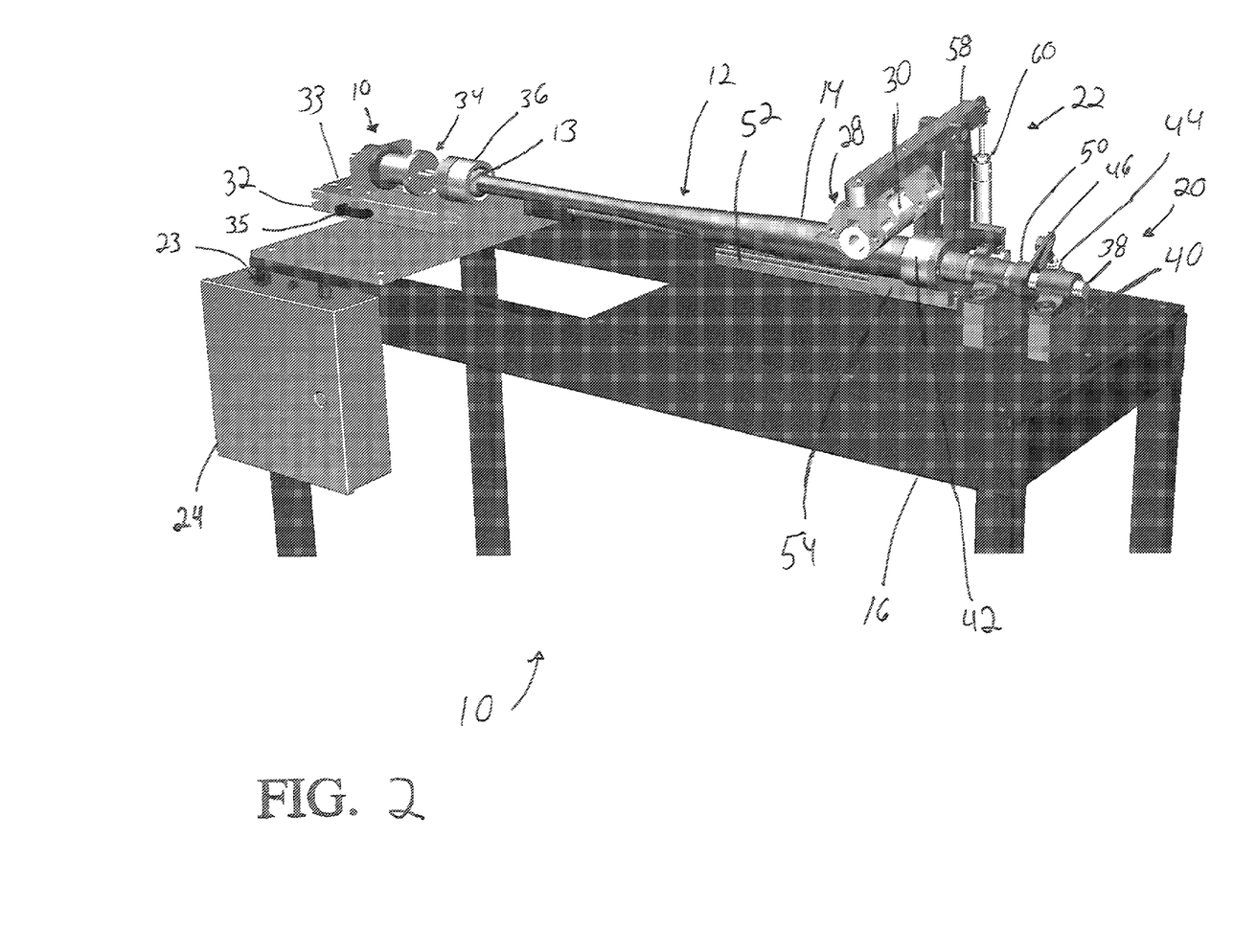
FIG. 2 is an alternate perspective view of an apparatus made in accordance with the current disclosure.
Figure 3:
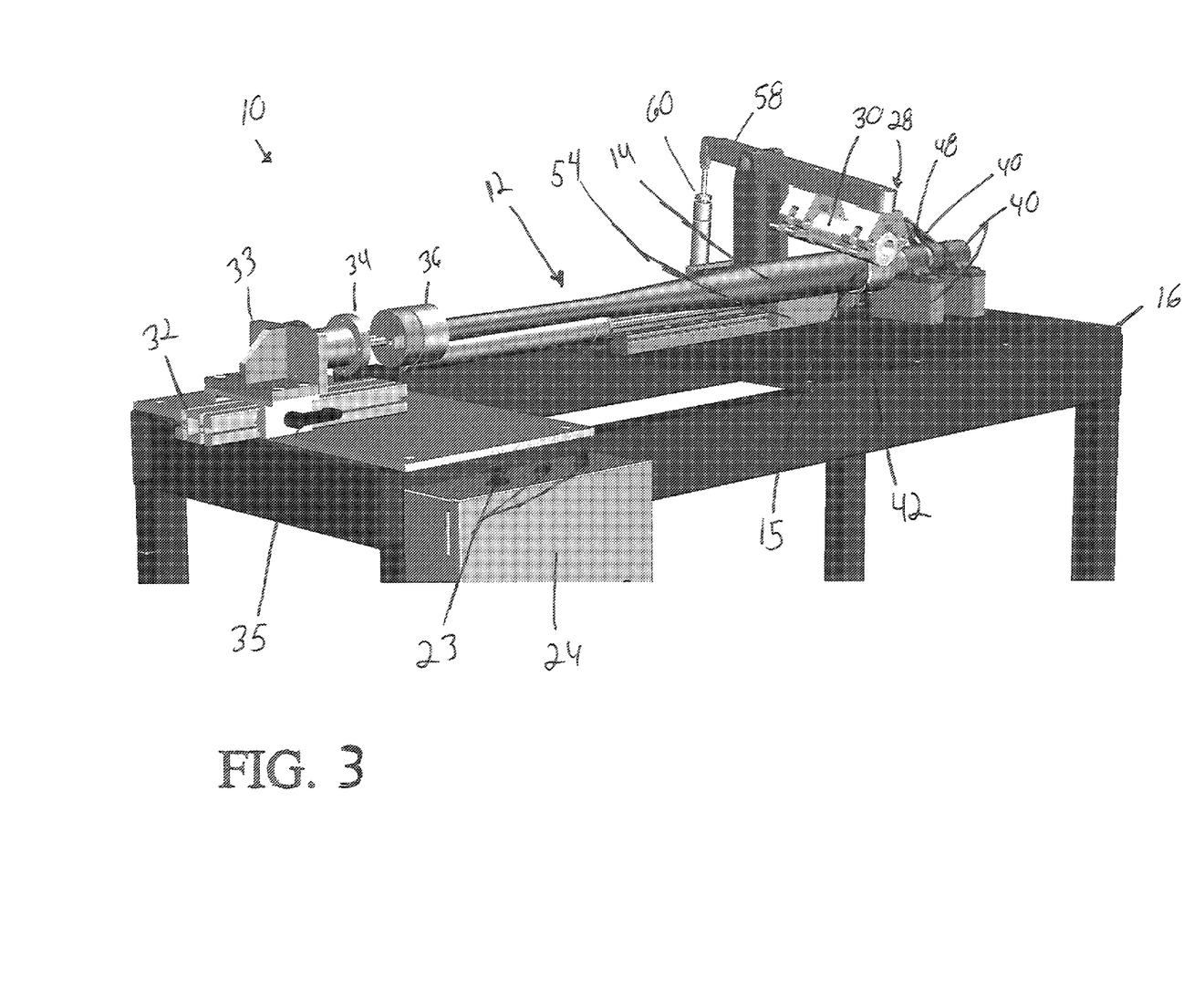
FIG. 3 is an alternate perspective view of an apparatus made in accordance with the current disclosure.
Figure 4:
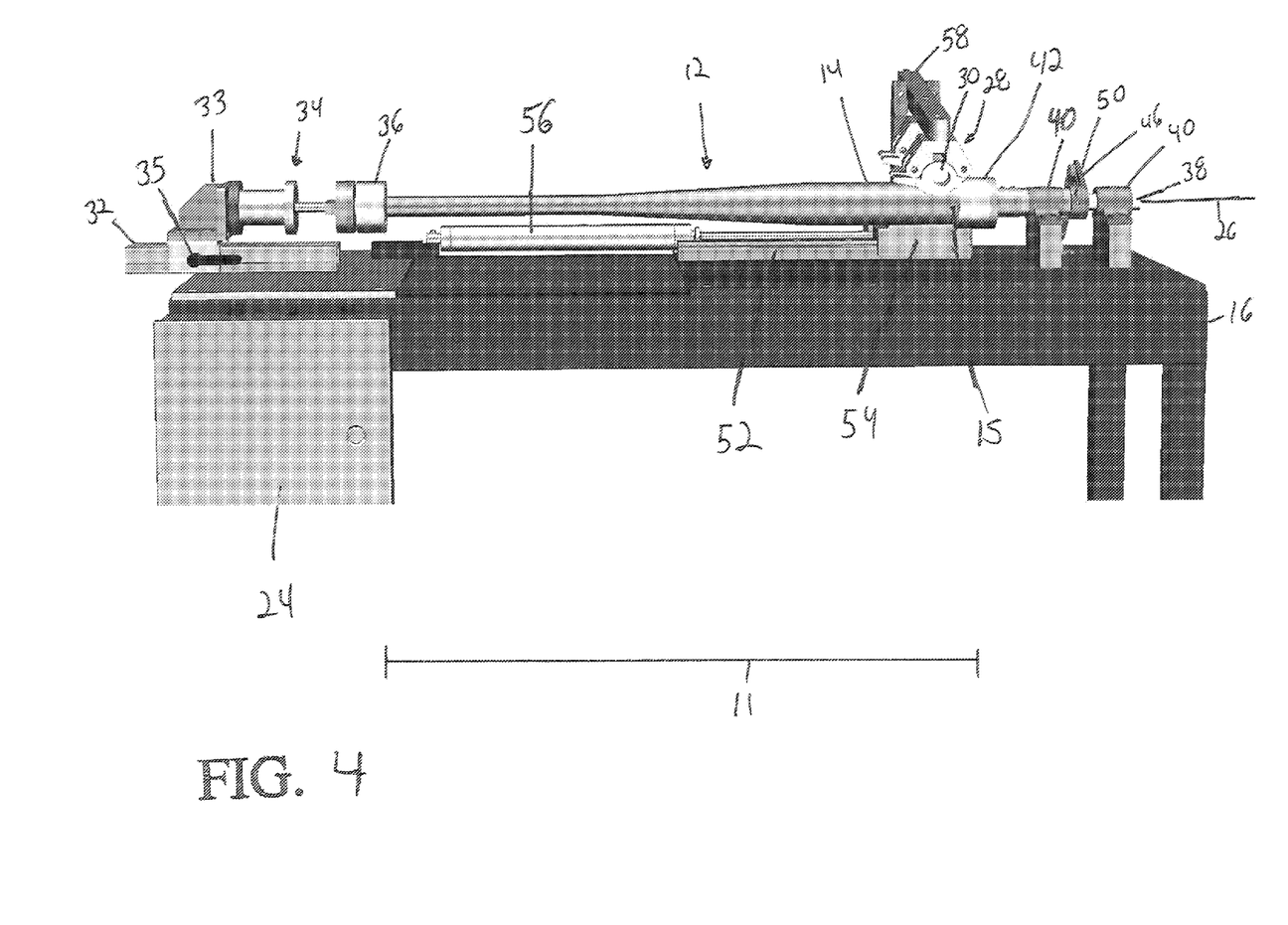
FIG. 4 is a front view of an apparatus made in accordance with the current disclosure.

Once the wooden bat 12 is in position, an operator can activate the controller 24 by pressing one of the activation buttons 23 positioned on the controller 24. Various activation buttons 23 can include "go," "stop," and "emergency shut off." Other safety features can include a shield 64, as best seen in FIG. 1, to protect the operator.

Once the start button is activated, the controller 24 activates the clamp 34 to engage the knob holder 36 to the knob 13. In this instance, the clamp 34 is actuated such that the knob holder 36 extends to engage the knob 13. This effectively lifts the bat from any bat support 62 and secures the barrel end 15 in the barrel end holder 42. The controller 24 then activates the pressure device 60 to move the armature 58. This movement also moves the bone attachment location 28 proximate to the barrel 14 of the wooden bat 12 such that the bone 30 comes into contact with the barrel 14 of the wooden bat 12. This pressure can be set at various desirable ranges and can be preferably set between 30-50 pounds per square inch This range can be adjusted as desired based upon the desired outcome and materials being used including wood and "bone" as defined above. It a preferred operation, the optimal pressure is approximately 40 pounds per square inch.

Next, the controller activates the translation device 56. This translation device 56 moves a carrier 54 along the track 52. With this movement, the bone 30 is pressed against the barrel 14 for the length of that movement. The translation device 56 can then be activated again such that the carrier 54 returns back along the track 52 to approximately its original starting position. This of course also will engage the bone 30 along the barrel 14 of the wooden bat 12. This movement effectively "bones" a section of the barrel 14. At this time the controller 24 can activate the drive mechanism 44 such that the shaft 38 is rotated through the lever arm 46. This rotation of the shaft 38 effectively rotates the barrel end holder 42 and the wooden bat 12. This movement effectively indexes the wooden bat 12. In a preferred embodiment, the bat indexes between approximately $\frac{1}{16}^{th}$ of an inch to 1 inch. Preferably this index is approximately $\frac{1}{4}^{th}$ of an inch. This movement can be adjusted through the lever arm 46 and slot 48 along with the clutch 50. The program of a controller 24 can also affect this rotational movement.

Once the bat indexes a portion of the rotation, the translation device 56 is activated again such that the carrier 54 translates down and back along the track 52. Again, this movement will effectively "bone" a section of the barrel 14 of the wooden bat 12 by engaging the bone 30 to that section of the barrel 14. During this movement the pressure device 60 maintains a substantially consistent pressure of the bone 30 against the barrel 14. This allows the bone 30 to follow the general contour of the barrel 14 and effectively "bone" that barrel section even if there are imperfections in the surface of the barrel 14.

Preferably in this movement the length of the movement of the carrier 54 along the track 52 approximately equals the barrel 14 of the wooden bat 12. This length can be adjusted as desired and additional sections of the wooden bat 12 can be "boned," or alternately a smaller section of the barrel 14 can be "boned."

Rotation of the bat can be facilitated by a bearing between the clamp 34 and knob holder 36 that allows rotation of the knob holder 36 with respect to the clamp 34. This bearing can be a type of bearing known in the art, such as a ball bearing.

In operation, the overall time for the apparatus 10 to complete its processing of the bat can have a range anywhere from a matter of seconds to several minutes. In a preferred embodiment, this is cycle time is approximately 70 seconds for the complete "boning" of the wooden bat 12 in the apparatus 10.

Thus, although there have been described particular embodiments of the present invention of a new and useful Automated Boning Machine for Wooden Bats it is not intended that such references be construed as limitations upon the scope of this invention except as set forth in the following claims.

What is claimed is:

1. An apparatus for bone rubbing a wooden bat having a length, a knob, a barrel, and a barrel end, the apparatus comprising:
    a base;
    a knob securing section attached to the base and shaped to accept the knob of the wooden bat, wherein the know securing feature further includes:
        a rail attached to the base; and
        a clamp slideably positioned along the rail;
    a rotatable barrel end securing section attached to the base opposite the knob securing section, the barrel end securing section shaped to accept the barrel end of the wooden bat and including an axis extending toward the knob securing section, wherein the clamp is operable to secure a wooden bat between the knob securing section and the barrel end securing section;
    a translating pressure tool attached to the base proximate the barrel end securing section and including a bone attachment location positioned proximate the axis opposite the base and shaped to accept a bone; and
    a controller operatively attached to the barrel end securing section and to the translating pressure tool, the controller having programming instructions to rotate the barrel end securing section, move the translating pressure tool approximately parallel to at least a portion of the length of the wooden bat, and to engage the wooden bat with the bone when the wooden bat and the bone are positioned in the apparatus.

2. The apparatus of claim 1, wherein the knob securing section further includes a knob holder extended from the clamp and shaped to accept the knob of the wooden bat.

3. The apparatus of claim 1, wherein the controller is operatively attached to the knob securing section and includes programming instructions to secure the wooden bat between the knob securing section and the barrel end securing section when the wooden bat is positioned in the apparatus.

4. An apparatus for bone rubbing a wooden bat having a length, a knob, a barrel, and a barrel end, the apparatus comprising:
    a base;
    a knob securing section attached to the base and shaped to accept the knob of the wooden bat;
    a rotatable barrel end securing section attached to the base opposite the knob securing section, the barrel end securing section shaped to accept the barrel end of the wooden bat and including an axis extending toward the knob securing section, wherein the barrel end securing section further includes:
        a shaft operative attached to the base
        a barrel end holder extended from the shaft and shaped to accept the barrel end of the wooden bat; and
        a drive mechanism attached to the base and the shaft, the drive mechanism positioned to rotate the shaft and barrel end holder along the axis;
    a translating pressure tool attached to the base proximate the barrel end securing section and including a bone attachment location positioned proximate the axis opposite the base and shaped to accept a bone; and
    a controller operatively attached to the barrel end securing section and to the translating pressure tool, the controller having programming instructions to rotate the barrel end securing section, move the translating approximately parallel to at least a portion of the length of the wooden bat, and to engage the wooden bat with the bone when the wooden bat and the bone are positioned in the apparatus.

5. The apparatus of claim 4, wherein the barrel end securing section further includes at least one bearing attached to the base and supporting the shaft.

6. The apparatus of claim 4, wherein the controller includes programming instructions to operate the drive mechanism to rotate the shaft, barrel end holder, and the wooden bat along the axis when the wooden bat is positioned in the apparatus.

7. The apparatus of claim 1, wherein the translating pressure tool further includes:
    a track positioned approximately parallel with the axis;
    a carrier operatively attached to the track;
    a translating device operatively attached to the base and to the carrier;
    an armature pivotally attached to the carrier and having the bone attachment location;
    a pressure device attached to the carrier and to the armature, the pressure device positioned to move the armature and the bone attachment location to engage the bone to the wooden bat when the wooden bat and the bone are positioned in the apparatus.

8. The apparatus of claim 7, wherein the controller includes programming instructions to operate the translating device to translate the carrier along the track, to activate the pressure device mechanism to move the armature and the bone attachment location to engage the bone along the barrel of the wooden bat when the wooden bat and the bone are positioned in the apparatus.

9. An apparatus for bone rubbing a wooden bat having a length, a knob, a barrel, and a barrel end, the apparatus comprising:
    a base;
    a knob securing section attached to the base and shaped to accept the knob of the wooden bat;

a barrel end securing section attached to the base opposite the knob securing section, the barrel end securing section shaped to accept the barrel end of the wooden bat and including:
a shaft operative attached to the base and having an axis
a barrel end holder attached to the shaft and shaped to accept the barrel end of the wooden bat; and
a drive mechanism attached to the base and the shaft, the drive mechanism positioned to rotate the shaft and barrel end holder along the axis;
a translating pressure tool attached to the base proximate the barrel end securing section and including a bone attachment location positioned above the axis opposite the base and shaped to accept a section of bone; and
a controller operatively attached to the barrel end securing section and to the translating pressure tool, the controller having programming instructions to:
operate the drive mechanism to rotate the shaft, barrel end holder, and
the wooden bat along the axis when the wooden bat is positioned in the apparatus; and
move the translating pressure tool approximately parallel to at least a portion of the length of the wooden bat to engage the wooden bat with the bone when the wooden bat and the bone are positioned in the apparatus.

10. The apparatus of claim 9, wherein the knob securing section further includes:
a rail attached to the base;
a clamp slideably positioned along the rail to secure a wooden bat between the knob securing section and the barrel end securing section; and
a knob holder extended from the clamp and shaped to accept the knob of the wooden bat.

11. The apparatus of claim 10, wherein the controller is operatively attached to the knob securing section and includes programming instructions to activate the clamp to secure the wooden bat between the knob securing section and the barrel end securing section when the wooden bat is positioned in the apparatus.

12. The apparatus of claim 9, wherein the barrel end securing section further includes at least one bearing attached to the base and supporting the shaft.

13. The apparatus of claim 9, wherein the translating pressure tool further includes:
a track positioned approximately parallel with the axis;
a carrier operatively attached to the track;
a translating device operatively attached to the base and to the carrier;
an armature pivotally attached to the carrier and having the bone attachment location;
a pressure device attached to the carrier and to the armature, the pressure device positioned to move the armature and the bone attachment location to engage the bone to the wooden bat when the wooden bat and the bone are positioned in the apparatus.

14. The apparatus of claim 13, wherein the controller is operatively attached to the translating pressure tool and includes programming instructions to operate the translating device to translate the carrier along the track, to active the pressure device mechanism to move the armature and the bone attachment location to engage the bone along the barrel of the wooden bat when the wooden bat and the bone are positioned in the apparatus.

15. An apparatus for bone rubbing a wooden bat having a length, a knob, a barrel, and a barrel end, the apparatus comprising:
a base;
a knob securing section attached to the base and shaped to accept the knob of the wooden bat;
a barrel end securing section attached to the base opposite the knob securing section, the barrel end securing section shaped to accept the barrel end of the wooden bat and including an axis extending toward the knob securing section;
a translating pressure tool attached to the base proximate the barrel end securing section, the translating pressure tool including:
a track positioned approximately parallel with the axis;
a carrier operatively attached to the track;
a translating device operatively attached to the base and to the carrier;
an armature pivotally attached to the carrier
a bone attachment location attached to the armature and positioned proximate the axis and opposite the base, the bone attachment location shaped to accept and secure a section of bone; and
a pressure device attached to the carrier and to the armature, the pressure device positioned to move the armature and the bone attachment location to engage the bone to the wooden bat when the wooden bat and the bone are positioned in the apparatus; and
a controller operatively attached to the barrel end securing section and to the translating pressure tool, the controller having programming instructions to:
rotate the barrel end securing section;
operate the translating device to translate the carrier along the track; and
activate the pressure device mechanism to move the armature and the bone attachment location to engage the bone along the barrel of the wooden bat when the wooden bat and the bone are positioned in the apparatus.

16. The apparatus of claim 15, wherein the knob securing section further includes:
a rail attached to the base;
a clamp slideably positioned along the rail to secure a wooden bat between the knob securing section and the barrel end securing section; and
a knob holder extended from the clamp and shaped to accept the knob of the wooden bat.

17. The apparatus of claim 16, wherein the controller is operatively attached to the knob securing section and includes programming instructions to activate the clamp to secure the wooden bat between the knob securing section and the barrel end securing section when the wooden bat is positioned in the apparatus.

18. The apparatus of claim 15, wherein the barrel end securing section further includes:
at least one bearing attached to the base;
a shaft attached to the bearing;
a barrel end holder extended from the shaft and shaped to accept the barrel end of the wooden bat;
a drive mechanism attached to the base and the shaft, the drive mechanism positioned to rotate the shaft and barrel end holder along the axis.

19. The apparatus of claim 18, wherein the controller includes programming instructions to operate the drive mechanism to rotate the shaft, barrel end holder, and the wooden bat along the axis when the wooden bat is positioned in the apparatus.

* * * * *

UNITED STATES PATENT AND TRADEMARK OFFICE
CERTIFICATE OF CORRECTION

PATENT NO. : 9,498,830 B1  
APPLICATION NO. : 13/568864  
DATED : November 22, 2016  
INVENTOR(S) : Mark Robinson Page 1 of 1

It is certified that error appears in the above-identified patent and that said Letters Patent is hereby corrected as shown below:

In Column 8 Line 27, Claim 4, after the term "translating" insert -- pressure tool --

Signed and Sealed this
Thirty-first Day of October, 2017

Joseph Matal
*Performing the Functions and Duties of the
Under Secretary of Commerce for Intellectual Property and
Director of the United States Patent and Trademark Office*